United States Patent
Noguchi

(10) Patent No.: US 7,727,322 B2
(45) Date of Patent: Jun. 1, 2010

(54) PRECURSOR SOLUTION, METHOD FOR MANUFACTURING PRECURSOR SOLUTION, PZTN COMPOUND OXIDE, METHOD FOR MANUFACTURING PZTN COMPOUND OXIDE, PIEZOELECTRIC ELEMENT, INK JET PRINTER, FERROELECTRIC CAPACITOR, AND FERROELECTRIC MEMORY

(75) Inventor: Motohisa Noguchi, Suwa (JP)

(73) Assignee: Seiko Epson Corporation (JP)

( * ) Notice: Subject to any disclaimer, the term of this patent is extended or adjusted under 35 U.S.C. 154(b) by 782 days.

(21) Appl. No.: 11/224,717

(22) Filed: Sep. 12, 2005

(65) Prior Publication Data

US 2006/0062723 A1    Mar. 23, 2006

(30) Foreign Application Priority Data

Sep. 17, 2004    (JP) ............................. 2004-271879

(51) Int. Cl.
| | |
|---|---|
| B01F 3/08 | (2006.01) |
| C01G 21/02 | (2006.01) |
| C01G 23/04 | (2006.01) |
| C01G 25/02 | (2006.01) |
| C01G 57/00 | (2006.01) |

(52) U.S. Cl. ............................ 106/287.19; 106/287.18; 423/593.1; 423/598; 423/594.8; 423/594.12; 427/376.6; 516/33

(58) Field of Classification Search ............ 423/594.12, 423/598, 608; 106/287.19, 287.18; 427/376.6; 516/33
See application file for complete search history.

(56) References Cited

U.S. PATENT DOCUMENTS 5,610,853 A *  3/1997 Akiyama et al. ............ 365/145

2004/0013794 A1 *  1/2004 Hashimoto et al. .......... 427/100
2004/0214352 A1    10/2004 Kijima et al.

FOREIGN PATENT DOCUMENTS

| JP | 0674019 | 3/1995 |
|---|---|---|
| JP | 7-252664 | 10/1995 |

OTHER PUBLICATIONS

Jungho Ryu, et al., "Effect of Heating Rate on the Sintering Behavior and the Piezoelectric Properties of Lead Zirconate Titanate Ceramics", J. Am. Ceram. Soc., vol. 84, No. 4, pp. 902-904 (2001).
L. Bellaiche, et al., "Intrinsic Piezoelectric Response in Perovskite Alloys: PMN-PT versus PZT", Physical Review Letters, The American Physical Society, vol. 83, No. 7, pp. 1347-1350 (1999).

* cited by examiner

Primary Examiner—Stanley Silverman
Assistant Examiner—James Fiorito
(74) Attorney, Agent, or Firm—Harness, Dickey & Pierce, P.L.C.

(57) ABSTRACT

A method for manufacturing a precursor solution for forming a PZTN compound oxide with Pb, Zr, Ti and Nb as constituent elements by a sol-gel method includes: a step of dissolving at least lead carboxylate with an organic solvent having an alkoxy group, to thereby form a first solution; a step of heat treating the first solution to remove crystallization water of the lead carboxylate and to form lead alkoxide by a ligand replacement reaction between the lead carboxylate and the organic solvent having the alkoxy group, to thereby form a second solution including the lead alkoxide; a step of mixing an alkoxide of a metal selected from at least one of Zr, Ti and Nb excluding Pb with the second solution, to thereby form a third solution including metal alkoxides of Pb, Zr, Ti and Nb, respectively; and a step of adding water to the third solution to cause hydrolysis-condensation of the metal alkoxides, to thereby form a fourth solution including a precursor of PZTN compound oxide.

5 Claims, 3 Drawing Sheets

PRECURSOR SOLUTION, METHOD FOR MANUFACTURING PRECURSOR SOLUTION, PZTN COMPOUND OXIDE, METHOD FOR MANUFACTURING PZTN COMPOUND OXIDE, PIEZOELECTRIC ELEMENT, INK JET PRINTER, FERROELECTRIC CAPACITOR, AND FERROELECTRIC MEMORY

RELATED APPLICATIONS

This application claims priority to Japanese Patent Application No. 2004-271879 filed Sep. 17, 2004 which is hereby expressly incorporated by reference herein in its entirety.

BACKGROUND

1. Technical Field

The present invention relates to precursor solutions for forming PZTN compound oxides, methods for manufacturing precursor solutions, PZTN compound oxides, methods for manufacturing PZTN compound oxides, piezoelectric elements, ink jet printers, ferroelectric capacitors, and ferroelectric memories.

2. Related Art

Ferroelectric materials including PZT are used in various applications, such as, ferroelectric memories, piezoelectric elements, infrared ray sensors, SAW devices and the like, and their research and development are actively conducted.

A liquid phase method such as a sol-gel method, an MOD method and the like is known as a typical method for forming ferroelectrics.

In the metal organic decomposition method (MOD: Metal Organic Decomposition Method), solutions of organometallic compounds are mixed for the use. In the MOD method, the gel after being coated contains very few polycondensate having M-O-M bonds, compared to the sol-gel method, such that necessary oxygen is supplied to the ferroelectric by conducting a heat-treatment in oxygen after coating. Therefore, according to the MOD method, while there is an advantage in that the restriction on material selection is fewer, there is a difficulty in that oxygen deficiency would likely occur.

In contrast, the sol-gel method uses a precursor solution containing compound metal alkoxides that are polymerized by hydrolysis-condensation. The sol-gel method has an advantage in that the controllability of compositions of ferroelectric to be obtained is excellent as the compositions of the metal alkoxide solutions can be controlled.

It has not been possible to dope Nb at a high ratio when a PZTN compound oxide with Pb, Zr, Ti and Nb being constituent elements is formed by a solution method. For example, the Nb doping in PZT has been mainly performed into Zr-rich rhombohedral crystal regions, and its amount is extremely small, on the order of 0.2 to 0.025 mol % (see J. Am. Ceram. Soc, 84 (2001) 902 and Phys. Rev. Let, 83 (1999) 1347).

It is an object of the present invention, in a sol-gel method, to provide precursor solutions for forming PZTN compound oxides that are excellent in composition controllability, methods for manufacturing the precursor solutions, methods for manufacturing PZTN compound oxides using the precursor solutions, and PZTN compound oxides.

It is another object of the present invention to provide piezoelectric elements, ink jet printer, ferroelectric capacitors and ferroelectric memories, using PZTN compound oxides of the present invention.

SUMMARY

A method for manufacturing a precursor solution in accordance with the present invention pertains to a method for manufacturing a precursor solution for forming a PZTN compound oxide with Pb, Zr, Ti and Nb as constituent elements by a sol-gel method, and includes:

a step of dissolving at least lead carboxylate with an organic solvent having an alkoxy group, to thereby form a first solution;

a step of heat treating the first solution to remove crystallization water of the lead carboxylate and to form lead alkoxide by a ligand replacement reaction between the lead carboxylate and the organic solvent having the alkoxy group, to thereby form a second solution including the lead alkoxide;

a step of mixing an alkoxide of a metal selected from at least one of Zr, Ti and Nb with the second solution, to thereby form a third solution including metal alkoxides of Pb, Zr, Ti and Nb, respectively; and a step of adding water to the third solution to cause hydrolysis-condensation of the metal alkoxides, to thereby form a fourth solution including a precursor of PZTN compound oxide.

According to this manufacturing method, a precursor solution with which a PZTN compound oxide that includes Nb at a high ratio can be formed by a sol-gel method can be obtained.

In the method for manufacturing a precursor solution in accordance with the present invention, the amount of the alkoxide of Nb may be 0.05-0.3 mol, and more preferably, 0.1-0.2 mol with respect to the total of 1 mol of the alkoxides of Zr, Ti and Nb.

In the method for manufacturing a precursor solution in accordance with the present invention, the organic solvent may be an organic solvent having an alkoxy group with a carbon number being 3 to 12.

In the method for manufacturing a precursor solution in accordance with the present invention, the organic solvent may have a boiling point higher than a boiling point of acetic acid.

In the method for manufacturing a precursor solution in accordance with the present invention, the amount of water that is added to the third solution may be 0.0001-0.01 mol with respect to one mol of the PZTN compound oxide.

In the method for manufacturing a precursor solution in accordance with the present invention, a stabilizing agent for controlling hydrolysis-condensation reaction may be further added to the fourth solution.

A precursor solution in accordance with the present invention is obtained by the method for manufacturing a precursor solution in accordance with the present invention described above, and includes a condensation product of metal alkoxides of Pb, Zr, Ti and Nb.

In the precursor solution in accordance with the present invention, Nb may be included in a ratio of 0.05-0.3 mol, and more preferably 0.1-0.2 mol with respect to the total of 1 mol of Zr, Ti and Nb.

The precursor solution in accordance with the present invention may further include a stabilizing agent for controlling hydrolysis-condensation reaction.

A PZTN compound oxide in accordance with the present invention is formed by using the precursor solution in accordance with the present invention, and is expressed by a general formula, $Pb(Zr_xTi_yNb_z)O_3$, where $x+y+z=1$, and $0.05 \leq z \leq 0.3$.

In the PZTN compound oxide in accordance with the present invention, z may preferably be $0.1 \leq z \leq 0.2$.

A method for manufacturing a PZTN compound oxide film includes the steps of coating the precursor solution in accordance with the present invention on a conductive film, and heat-treating the precursor solution.

In the method for manufacturing a PZTN compound oxide film in accordance with the present invention, the conductive film may be formed from a platinum group metal.

A piezoelectric element in accordance with the present invention uses the PZTN compound oxide in accordance with the present invention.

An ink jet printer in accordance with the present invention includes the piezoelectric element in accordance with the present invention.

A ferroelectric capacitor in accordance with the present invention uses the PZTN compound oxide in accordance with the present invention.

A ferroelectric memory in accordance with the present invention includes the ferroelectric capacitor in accordance with the present invention.

DETAILED DESCRIPTION

Figure 1:
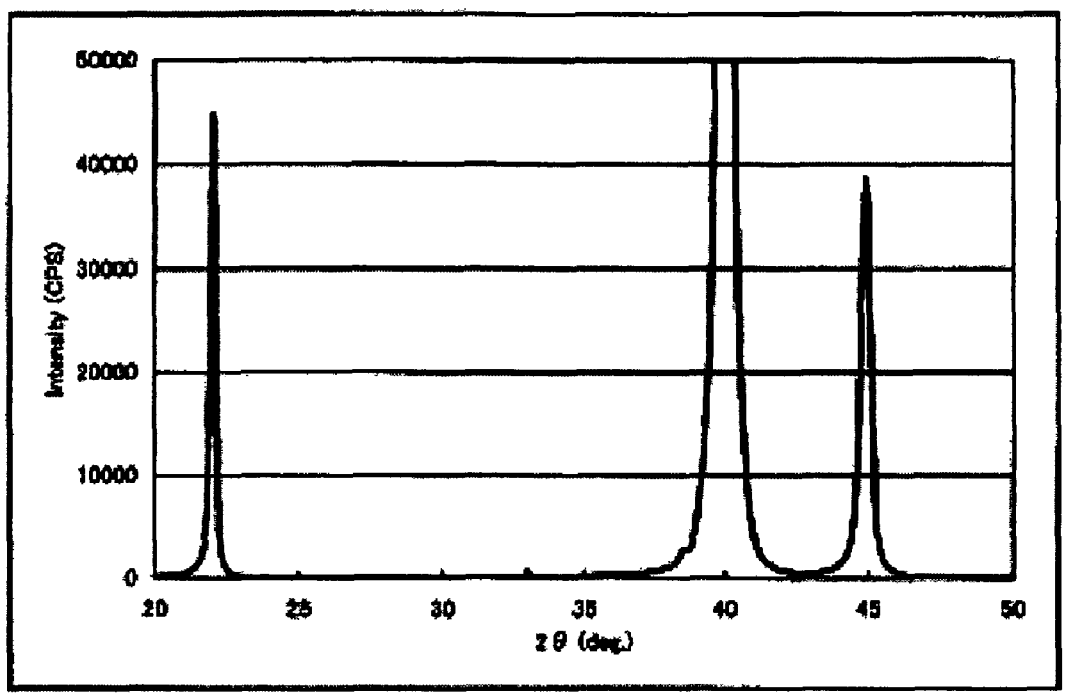
FIG. 1 is a graph showing an XRD chart of samples in accordance with Exemplary Embodiment 1.

Embodiments of the present invention are described below in greater detail.

1. Precursor Solution and Its Manufacturing Method

A method for manufacturing a precursor solution pertains to a method for manufacturing a precursor solution for forming a PZTN compound oxide with Pb, Zr, Ti and Nb as constituent elements by a sol-gel method, and mainly includes steps (a)-(d) as follows:

(a) a step of dissolving at least lead carboxylate with an organic solvent having an alkoxy group, to thereby form a first solution;

(b) a step of heat-treating the first solution to remove crystallization water of the lead carboxylate and to form lead alkoxide by a ligand replacement reaction between the lead carboxylate and the organic solvent having the alkoxy group, to thereby form a second solution including the lead alkoxide;

(c) a step of mixing an alkoxide of a metal selected from at least one of Zr, Ti and Nb with the second solution, to thereby form a third solution including metal alkoxides of Pb, Zr, Ti and Nb, respectively; and (d) a step of adding water to the third solution to cause hydrolysis-condensation of the metal alkoxides, to thereby form a fourth solution including a precursor of PZTN compound oxide.

Each of the steps is described below.

In the step (a), at least lead carboxylate is dissolved with an organic solvent having an alkoxy group, to thereby form a first solution.

Lead carboxylate is chemically stable, compared to alkoxide of lead, and particularly stable against water, such that the control of reaction system is much easier, compared to the case where lead alkoxide is directly used.

As lead carboxylate, for example, lead acetate, lead citrate, lead cyclohexane butyrate, lead maleate, lead oleate, and lead octoate may be used.

As the organic solvent having an alkoxy group, alcohols such as, n-buthanol, sec-buthanol, tert-buthanol, n-penthanol, n-hexanol, n-heptanol, n-octanol, methoxyethanol, ethoxyethanol, 2-propoxyethanol, n-butoxyethanol and the like, diols such as propylene grycol and the like, esters such as 2-hydroxyethyl acetate and the like, cyclic hydrocarbons such as cyclobutanol, cyclopentanol, cyclohexanol and the like, and aromatics such as phenoxyethanol and the like can be used. Also, the organic solvent may have a boiling point higher than the boiling point of acetic acid that is generated by a ligand replacement reaction between lead carboxylate and an organic solvent having an alkoxy group in the step (b) to be described below.

As such an organic solvent, an organic solvent having an alkoxy group with the carbon number being 3 to 6 may preferably be used. This is because carboxylate has a high polarity, and alcohol has a higher polarity with a lower number of carbon number, such that carboxylate can be better dissolved therein.

The first solution describe above can be readily formed by the above.

In the step (a), besides lead carboxylate, carboxylates or complexes of Zr, Ti and Nb may be included. For example, as those carboxylates or complexes, zirconium acetylacetonato, zirconium octylate, titanium octylate, niobate octylate and the like can be enumerated. The first solution containing carboxylates or complexes of metals other than lead can become alkoxides in the step (b). In this case, alkoxides that are added in the step (c) can be selected according to compositions of the PZTN compound oxide.

In the step (b), the first solution is heat-treated to remove crystallization water of the lead carboxylate and to form lead alkoxide by a ligand replacement reaction between the lead carboxylate and the organic solvent having the alkoxy group, to thereby form a second solution including the lead alkoxide;

The heat-treatment in the step (b) is conducted at temperatures that are sufficient at least to remove crystallization water of the lead carboxylate and to cause a ligand replacement reaction between the lead carboxylate and the organic solvent having the alkoxy group. The temperatures of the heat-treatment may differ depending on lead acetate and the kind of the organic solvent, but may be, for example, 110-180° C. from the view point of effectively removing water in the system and acetic acid that is generated by the ligand replacement reaction. In the step (b), water in the second solution is removed so as to become, for example, 0.1 weight % with respect to the second solution. When the amount of water in the second solution is greater than the amount described above, hydrolyzates of metal alkoxides are generated in the step (c), which causes undesirable precipitation.

In the step (b), metals such as lead may preferably be almost completely transformed into alkoxides by completing the ligament replacement reaction. However, it may not be necessary to completely transform them into metal alkoxides, and for example, generation of about 30% metal alkoxides may be sufficient. Metal alkoxides are materials that are chemically unstable and highly reactive, but become relatively stable and their handling becomes easier when the metal alkoxides are in the form of solution.

In the step (c), an alkoxide of a metal selected from at least one of Zr, Ti and Nb is mixed with the second solution, to thereby form a third solution including metal alkoxides of Pb, Zr, Ti and Nb, respectively. When the third solution is formed, the solution can be heated to a temperature ranging between 110° C. and 180° C.

In the third solution, the amount of the alkoxide of Nb may be 0.05-0.3 mol, and more preferably, 0.1-0.2 mol with respect to the total of 1 mol of the alkoxides of Zr, Ti and Nb. In this manner, by setting the amount of the metal alkoxide, a PZTN compound oxide aimed by the present invention can be obtained.

As the alkoxide of zirconium, zirconium methoxide, zirconium ethoxide, zirconium tetra isopropoxide, zirconium tetra-n-propoxide, zirconium tetra-n-butoxide, zirconium tetra isobutoxide, zirconium tetra-sec-butoxide, and zirconium-tert-butoxide can be enumerated.

As the alkoxide of titanium, titanium tetra methoxide, titanium tetra ethoxide, titanium tetra isopropoxide, titanium tetra-n-propoxide, titanium tetra-n-butoxide, titanium tetra-sec-butoxide, and titanium-tert-butoxide can be enumerated.

As the alkoxide of niobate, pentamethoxyniobate, panta-n-butoxynionate, panta-i-butoxynionate, panta-sec-butoxynionate, pentaethoxyniobate, penta-n-propoxynibate can be enumerated.

In the step (d), water is added to the third solution, to cause hydrolysis-condensation of the metal alkoxides, to thereby form a fourth solution including a precursor of PZTN compound oxide.

The amount of water to be added to the third solution may be 0.0001-0.01 mol with respect to one mol of the PZTN compound oxide described above. Here, when water is added to the third solution, the water may be directly added to the solution. However, in this case, sediments of hydroxides caused by hydrolysis-condensation would likely be generated. Accordingly, water may preferably be diluted in advance with a solvent that mixes with the water, and added to the third solution. Alternatively, instead of directly adding water to the third solution, moisture in the air may be absorbed. However, to sufficiently cause the hydrolysis-condensation reaction, water may preferably be added to the third solution. Also, in order to cause the hydrolysis-condensation reaction, temporary-sintering may be conducted in an air atmosphere, an oxidation atmosphere, or a water bearing vapor atmosphere. However, the hydrolysis-condensation reaction may not sufficiently take place in this case either, and therefore it is preferred to add water in the third solution.

In the present embodiment, because metal alkoxides are highly reactive, and the hydrolysis-condensation reaction can normally take place only with water. However, an acidic or basic catalyst can be added depending on the requirements.

In the step (d), the specific metal alkoxides mixed in advance in a specific composition ratio undergo hydrolysis-condensation, whereby a precursor of a polymerized PZTN compound oxide is formed.

After the step (d), a stabilizing agent for controlling the hydrolysis-condensation reaction to thereby controlling the amount of molecules of the precursor may be further added to the fourth solution.

As the stabilizing agent, known materials can be used. For example, alkanolamines such as diethanolamine and the like, as well as diols, carboxylic acids, β-diketones, and β-ketoesters can be used. The stabilizing agent serves as a trap agent, and therefore works to suppress the progress of gelling reaction. Accordingly, before the stabilizing agent is added, the gelling reaction may be progressed in advance to a certain degree to form networks (precursor) in the solution. However, as the gelling reaction progresses, the viscosity of the solution becomes greater. Therefore, the stabilizing agent may preferably be added when the gelling reaction has progressed to a certain degree to adjust the viscosity of the final precursor solution to be about 4-10 cP so as to be readily applied in a spin coat method or a dip coating method.

According to the manufacturing method of the present embodiment, a precursor solution with which a PZTN compound oxide containing Nb in a high ratio can be formed by a sol-gel method, as described below.

The precursor solution in accordance with the present embodiment can be obtained by the method for manufacturing the precursor solution of the present invention described above, and contains condensates of metal alkoxides of Pb, Zr, Ti and Nb. The precursor solution may include Nb in a rate of 0.05-0.3 mol, and more preferably, 0.1-0.2 mol with respect to the total of 1 mol of the alkoxides of Zr, Ti and Nb.

The precursor solution of the present embodiment may include the stabilizing agent for controlling hydrolysis-condensation described above. Further, the precursor solution may contain an additive depending on the requirements, such as, for example, a crack preventing agent such as known polyethylene glycol.

2. PZTN Compound Oxide

A PZTN compound oxide in accordance with the present embodiment is formed by using the precursor solution in accordance with the present embodiment, and is expressed by a general formula $Pb(Zr_xTi_yNb_z)O_3$, where $x+y+z=1$, and $0.05 \leq z \leq 0.3$. In the PZTN compound oxide of the present embodiment, in the aforementioned formula, z may preferably be $0.1 \leq z \leq 0.2$.

According to the PZTN compound oxide of the present embodiment, because Nb is included in the specific ratio described above, deteriorating influences by vacancy of Pb are cancelled, and excellent composition controllability is obtained. As a result, the PZTN compound oxide has excellent hysteresis characteristics, leakage characteristics, reduction resisting property, and dielectric property, compared to ordinary PZT. The reasons why the PZTN compound oxide of the present embodiment has such characteristics are considered to be as follows:

Because Nb has generally the same size as that of Ti (ionic radii are close to each other and atomic radii are identical), and weighs two times, it is hard for atoms to slip out the lattice even by collision among atoms by lattice vibration. Further, the valence of Nb is +5, which is stable. Therefore, even if Pb slips out, the valence resulting from the vacated Pb can be supplemented by $Nb^{5+}$. Also, even if a Pb vacancy occurs at the time of crystallization, it is easier for Nb having a small size to enter than O having a larger size to slip out.

Furthermore, Nb may also have a valence of +4, such that Nb can sufficiently substitute for $Ti^{4+}$. Moreover, Nb has in effect a very strong covalent bond, and it is believed that Pb is also difficult to slip out (H. Miyazawa, E. Natori, S. Miyashita; Jpn. J. Appl. Phys. 39 (2000) 5679).

3. Method for Manufacturing PZTN Compound Oxide Film

A method for manufacturing a PZTN compound oxide film in accordance with an embodiment includes coating the precursor solution of the present embodiment described above on a conductive film composed of, for example, a platinum group metal, and then heat-treating the same. The platinum group metal may be at least one of Pt and Ir. Instead of the platinum group metal, a perovskite type electrode material such as $SrRuO_3$, $LaNiO_3$ or the like can also be used. According to this manufacturing method, a PZTN compound oxide film having excellent characteristics can be obtained by a simple method using a known coating method.

4. Exemplary Embodiment

An exemplary embodiment of the present invention is described below.

4.1. Exemplary Embodiment 1

First, 1000 ml of 2-n-butoxyethanol was used as a solvent, and 0.505 mol of lead acetate trihydrate and 0.154 mol of zirconium acetylacetonato were added thereto. The solution was heated and stirred at about 150° C. for about 4 hours, to thereby remove water content present in the system. Also, it was confirmed that, by conducting these heating and stirring, ligand replacement took place between lead acetate and zirconium acetylacetonato and alcohol molecules in the solvent, whereby alkoxides of lead and zirconium were generated.

Then, 0.198 mol of titanium tetra isopropoxide and 0.088 mol of pentaethoxideniobate were added to the aforementioned solution in which dewatering process was completed, and the solution was further stirred at about 150° C. for 2 hours. Then, water was added to the solution, to cause hydrolysis and polymerization reaction. Here, water was diluted with 2-n-butoxyethanole to 3% and then added. The amount of water was 0.001 mol with respect to 1 mol of PZTN compound oxide (hereafter referred to as "PZTN").

Then, as a stabilizing agent, 3 mol of diethanolamine with respect to 1 mol of PZTN was added, to adjust the precursor solution including hydrolysis and condensation products (precursor). The viscosity of the precursor solution was 5.7 cP.

Then, a PZTN film was manufactured by using the precursor solution. A substrate composed of Pt (111)/$TiO_2$/$SiO_2$/Si (100) was used. Concretely, the solution was coated by a spin coat method on the substrate, and drying, cleaning and crystallization annealing treatments were conducted to form a PZTN film. The drying was conducted at 180° C., using a hot plate, the cleaning was conducted using a hot-plate at 400° C., and the crystallization annealing was conducted by using rapid thermal annealing (RTA) in an oxygen atmosphere at 700° C.

A XRD chart of the PZTN film obtained is shown in FIG. 1. It was confirmed from FIG. 1 that peaks were present at (100) and (200), and the PZTN of the present exemplary embodiment had excellent crystallinity.

Figure 3:
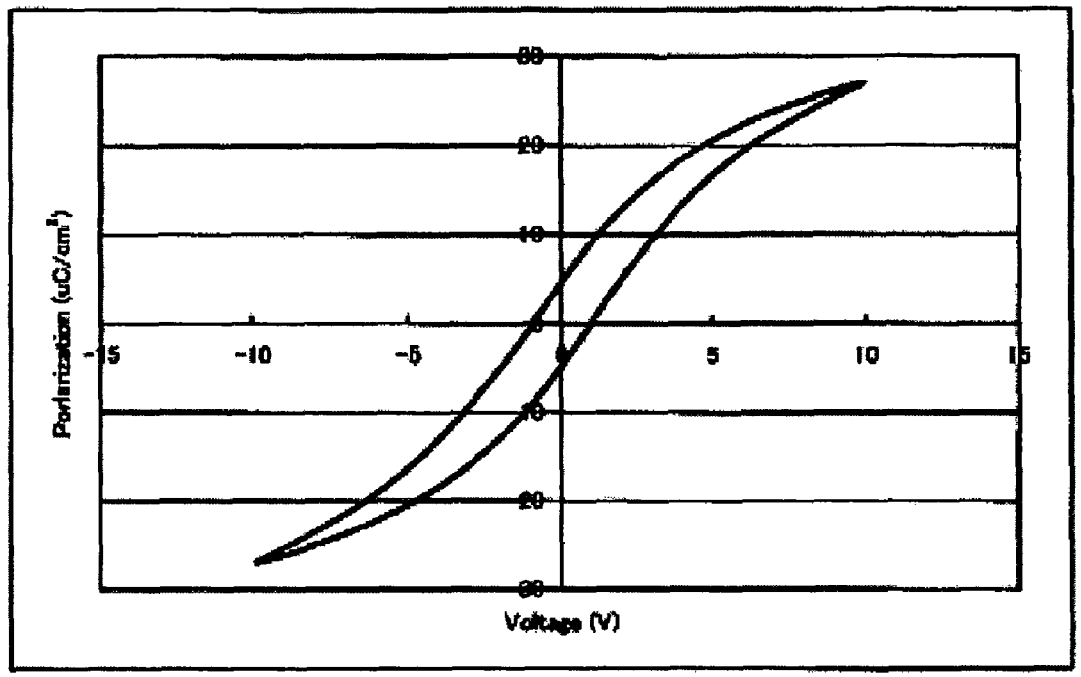
FIG. 3 is a graph showing hysteresis characteristics of samples in accordance with Exemplary Embodiment 1.
Figure 5:
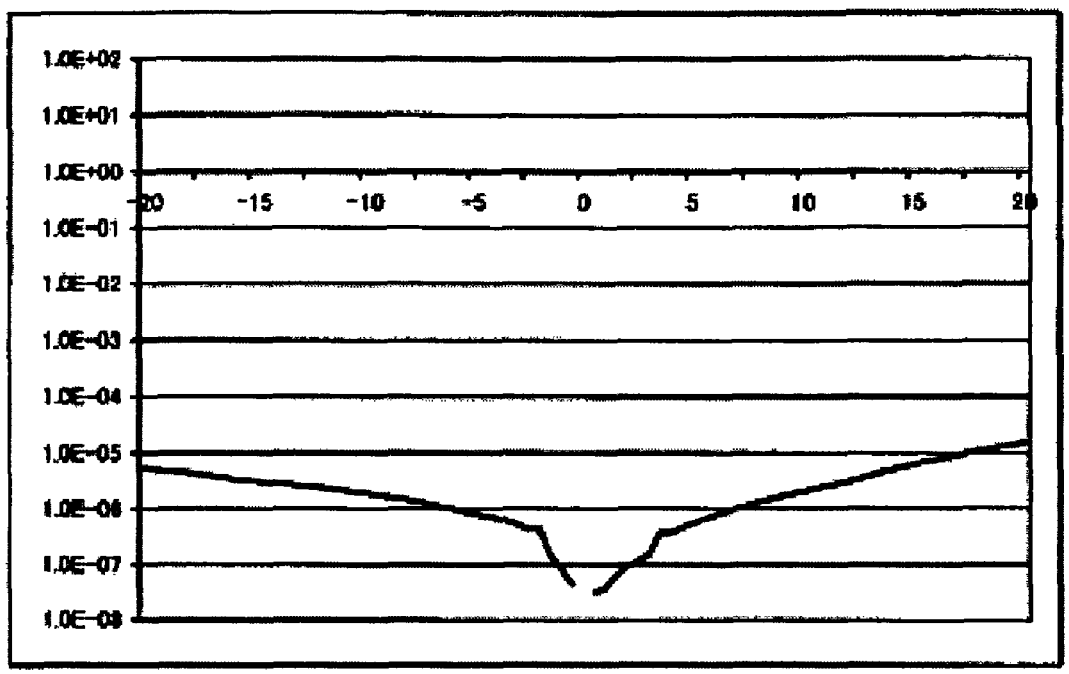
FIG. 5 is a graph showing leakage current characteristics of samples in accordance with Exemplary Embodiment 1.

Furthermore, Pt was provided as an upper electrode by a sputter method on the PZTN film to thereby form a sample. By using the samples, the hysteresis characteristics and leakage current characteristics of the PZTN film were obtained. These results are shown in FIG. 3 and FIG. 5. With the samples of the exemplary embodiment, it was confirmed from FIG. 3 that hysteresis of ferroelectric was obtained, and it was confirmed from FIG. 5 that leakage characteristics with good symmetric property were obtained.

4.2. Comparison Example 1

A solution was adjusted by using a MOD method (Metal Organic Decomposition) method. The same materials as those of the exemplary embodiment 1 were used in the same amount when the solution was adjusted. In other words, lead acetate, zirconium acetylacetonato, titanium tetra isopropoxide and pentaethoxideniobate were dissolved in 2-n-butoxyethanol to thereby obtain a MOD solution. In this instance, 3 mol of diethanolamine with respect to 1 mol of PZTN was added to the solvent, whereby gelation of titanium tetra isopropoxide and pentaethoxideniobate could be prevented although water was present in the system. In the MOD solution, lead acetate and zirconium acetylacetonato were present and remained to be in the form of salt and complex.

Figure 2:
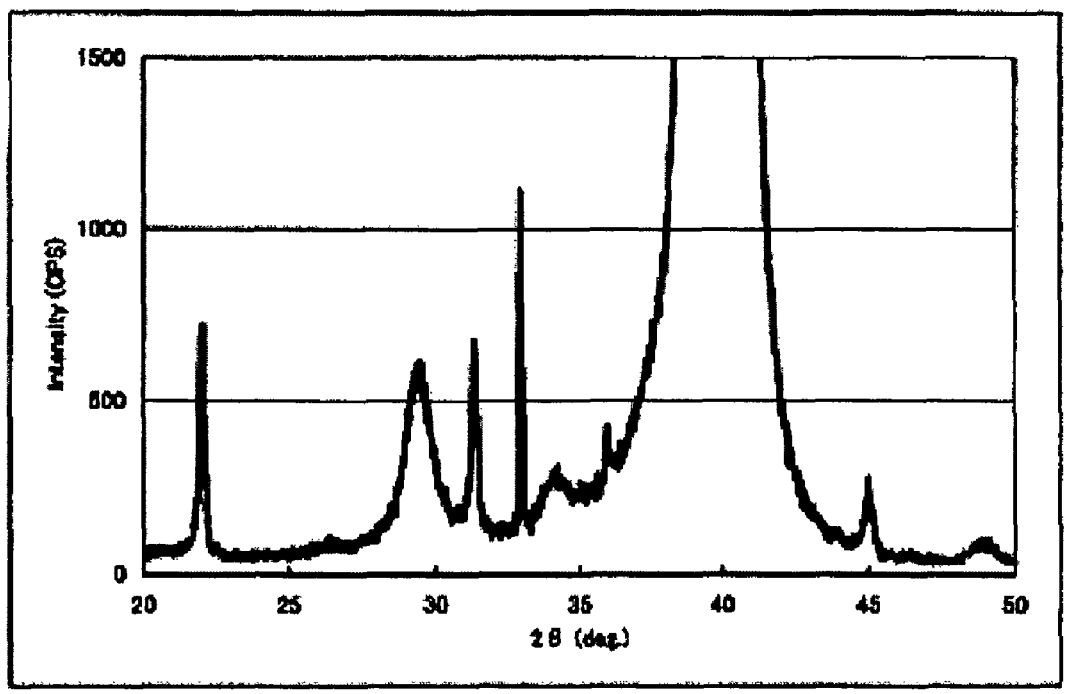
FIG. 2 is a graph showing an XRD chart of samples in accordance with Comparison Example 1.
Figure 4:
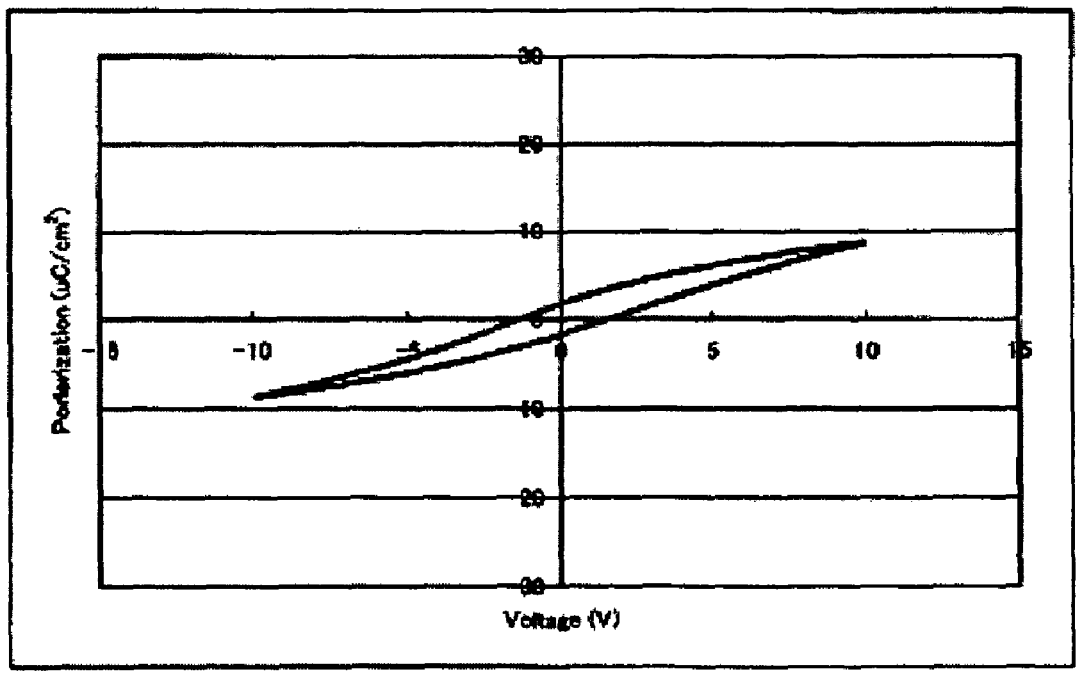
FIG. 4 is a graph showing hysteresis characteristics of samples in accordance with Comparison Example 1.
Figure 6:
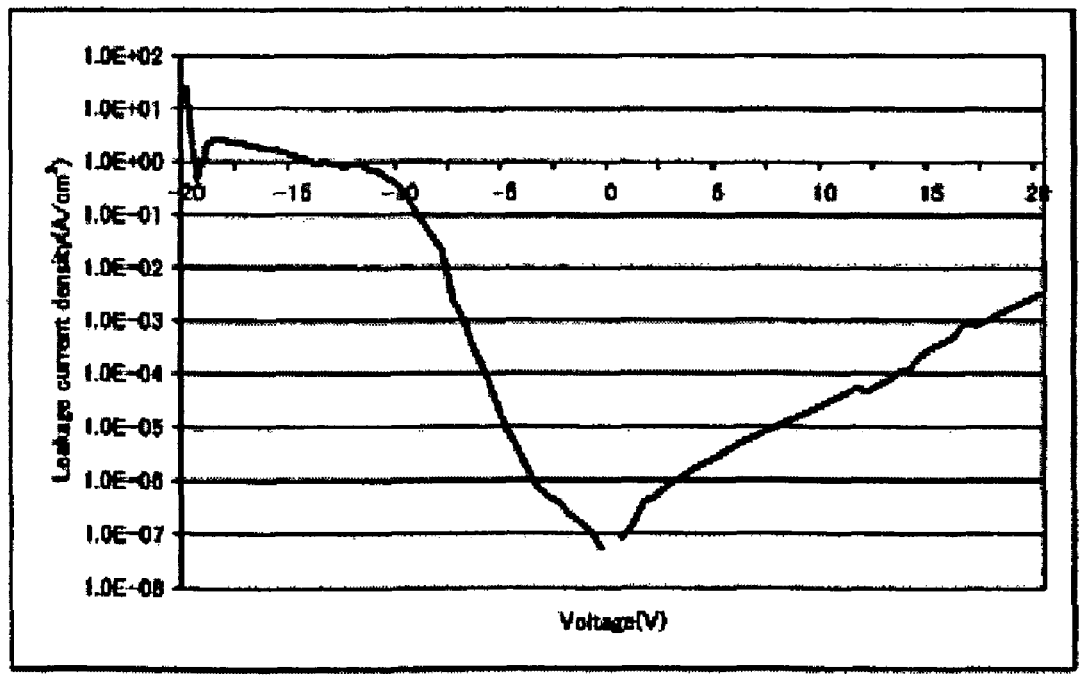
FIG. 6 is a graph showing leakage current characteristics of samples in accordance with Comparison Example 1.

The MOD solution obtained was coated on a substrate in a similar manner as the exemplary embodiment 1, and then film formation was conducted to thereby obtain samples as comparison examples. XRD charts, hysteresis characteristics and leakage current characteristics of the films of these samples were examined. The results are shown in FIG. 2, FIG. 4 and FIG. 6. It was confirmed from FIG. 2 that the comparison example had a peak of pyrochlore phase at about 29°, and its crystallinity was insufficient. Also, it was confirmed from FIG. 4 and FIG. 6 that, in the comparison example, good hysteresis characteristics or leakage current characteristics could not be obtained.

What is claimed is:

1. A method for manufacturing a precursor solution comprising:
   forming a first solution by dissolving lead carboxylate in an organic solvent having an alkoxy group to form a lead alkoxide;
   after forming the first solution, forming a second solution including the lead alkoxide by heating the first solution at a temperature ranging between 110° C. and 180° C.;
   after forming the second solution, forming a third solution by adding a zirconium alkoxide, a titanium alkoxide, and a niobium alkoxide to the second solution, the third solution thereby including the lead alkoxide, the zirconium alkoxide, the titanium alkoxide, and the niobium alkoxide; and
   after forming the third solution, forming a fourth solution provided by adding water to the third solution,
   wherein an amount of the niobium alkoxide is 0.05-0.3 mol with respect to a total of 1 mol of the zirconium, titanium, and niobium alkoxides.

2. The method for manufacturing a precursor solution according to claim 1, wherein, in the third solution, the amount of the niobium alkoxide is 0.1-0.2 mol with respect to a total of 1 mol of the zirconium, titanium, and niobium alkoxides.

3. The method for manufacturing a precursor solution according to claim 1, wherein the organic solvent has an alkoxy group with a carbon number of 3 to 12.

4. The method for manufacturing a precursor solution according to claim 1, wherein the amount of water that is added to the third solution is 0.0001-0.01 mol with respect to 1 mol of the PZTN compound oxide.

5. The method for manufacturing a precursor solution according to claim 1, wherein a stabilizing agent for controlling a hydrolysis-condensation reaction is added to the fourth solution.

* * * * *